US012597216B2

(12) United States Patent (10) Patent No.: US 12,597,216 B2
Kwak et al. (45) Date of Patent: Apr. 7, 2026

(54) ARTIFICIAL INTELLIGENCE VIRTUAL MAKEUP METHOD AND DEVICE USING MULTI-ANGLE IMAGE RECOGNITION

(71) Applicant: AINATION CO., LTD., Seoul (KR)

(72) Inventors: Jihoon Kwak, Gyeonggi-do (KR);
Sangeun Lee, Seoul (KR); Hyeonuk Kim, Seoul (KR)

(73) Assignee: AINATION CO., LTD., Seoul (KR)

( * ) Notice: Subject to any disclaimer, the term of this patent is extended or adjusted under 35 U.S.C. 154(b) by 163 days.

(21) Appl. No.: 18/293,952

(22) PCT Filed: Aug. 12, 2022

(86) PCT No.: PCT/KR2022/012100
§ 371 (c)(1),
(2) Date: Jan. 31, 2024

(87) PCT Pub. No.: WO2023/018285
PCT Pub. Date: Jan. 16, 2023

(65) Prior Publication Data
US 2024/0346774 A1     Oct. 17, 2024

(30) Foreign Application Priority Data
Aug. 13, 2021     (KR) ........................ 10-2021-0107648

(51) Int. Cl.
*G06T 19/00*     (2011.01)
*G06T 3/18*     (2024.01)
(Continued)

(52) U.S. Cl.
CPC .............. *G06T 19/006* (2013.01); *G06T 3/18* (2024.01); *G06T 5/50* (2013.01); *G06T 19/20* (2013.01);
(Continued)

(58) Field of Classification Search
None
See application file for complete search history.

(56) References Cited

U.S. PATENT DOCUMENTS 9,449,412 B1 *   9/2016   Rogers ............... G06V 10/7557
11,069,094 B1 *   7/2021   Evangelista ........... G06T 11/60
(Continued)

FOREIGN PATENT DOCUMENTS

KR     20190085802 A     7/2019
KR     20200107486 A     9/2020
(Continued)

*Primary Examiner* — Ryan M Gray
(74) *Attorney, Agent, or Firm* — Osha Bergman Watanabe & Burton LLP

(57) ABSTRACT

A method of operating a service providing device includes: collecting a source image and processing face warping of the collected source image to transform the collected source image into a warping image based on a benchmark image; constructing, using the face warped source image, a style database to which style information of the source image is mapped; and providing a style recommendation service based on style transfer using the style database. The providing includes: performing face warping on a user image input from a user terminal; performing style transfer of the face warped source image in response to the face warped user image; and processing face reverse warping of the image subjected to the style transfer to output as a virtual style synthesis image.

12 Claims, 9 Drawing Sheets

(51) Int. Cl.
    *G06T 5/50*          (2006.01)
    *G06T 19/20*        (2011.01)

(52) U.S. Cl.
    CPC .............. *G06T 2207/20221* (2013.01); *G06T 2219/2024* (2013.01)

(56)                 References Cited

U.S. PATENT DOCUMENTS

| | | | |
|---|---|---|---|
| 11,403,788 B2 * | 8/2022 | Su | G06T 11/001 |
| 12,136,153 B2 * | 11/2024 | Luo | G06V 10/774 |
| 12,277,735 B2 * | 4/2025 | Hunsmann | G06Q 30/0623 |
| 2019/0014884 A1 * | 1/2019 | Fu | G06T 1/0007 |
| 2019/0191850 A1 * | 6/2019 | Yoganandan | B26B 21/4056 |
| 2022/0202168 A1 * | 6/2022 | Troutman | G06T 19/006 |
| 2023/0101374 A1 * | 3/2023 | Kosecoff | G06V 40/171 |
| | | | 434/100 |
| 2024/0065420 A1 * | 2/2024 | Soskic | G06T 19/20 |

FOREIGN PATENT DOCUMENTS

| | | | |
|---|---|---|---|
| KR | 102288001 B1 | 8/2021 | |
| KR | 102377222 B1 | 3/2022 | |
| KR | 102406377 B1 | 6/2022 | |

* cited by examiner

FIG. 4

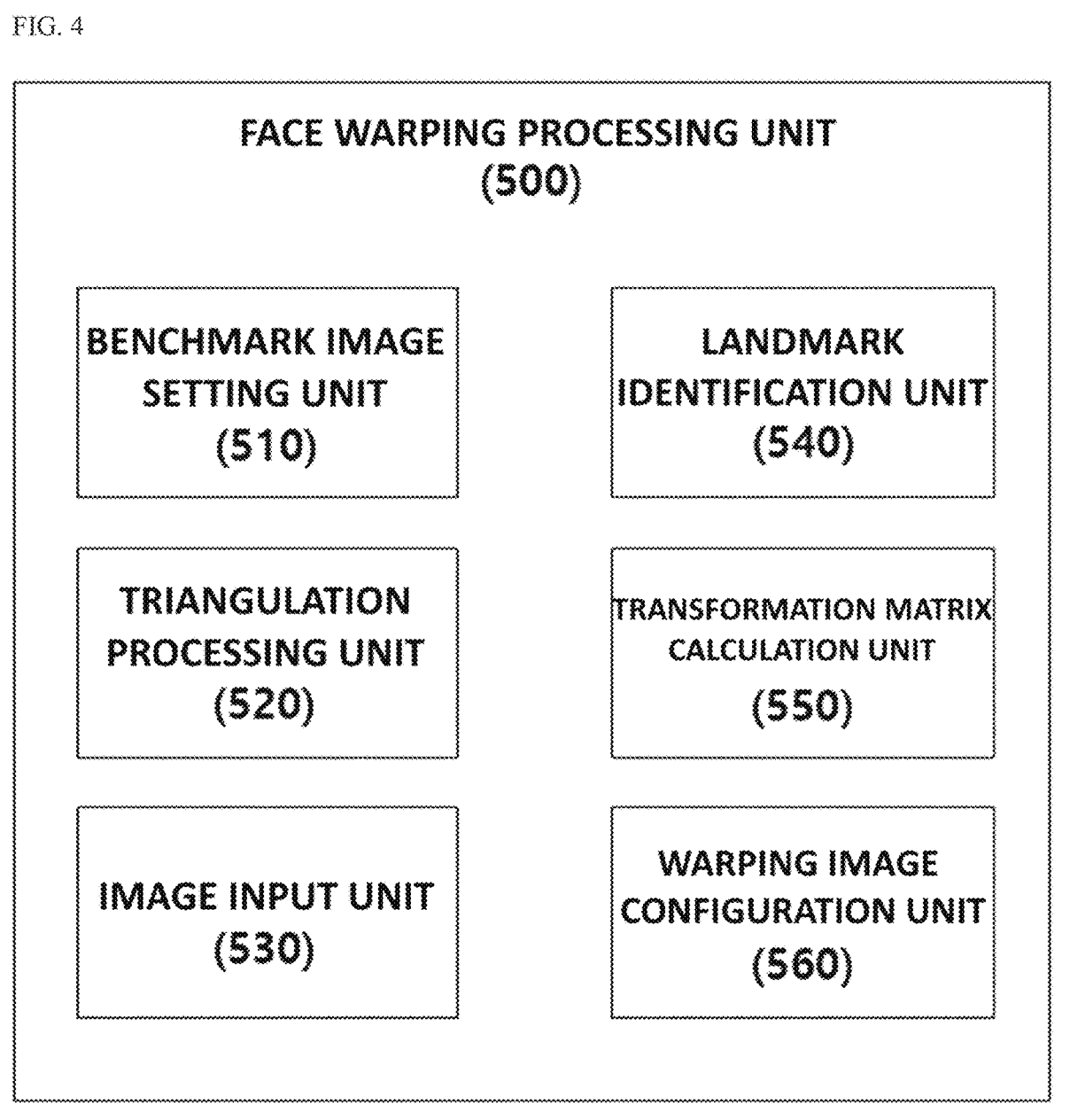

FACE WARPING PROCESSING UNIT
(500)

BENCHMARK IMAGE
SETTING UNIT
(510)

LANDMARK
IDENTIFICATION UNIT
(540)

TRIANGULATION
PROCESSING UNIT
(520)

TRANSFORMATION MATRIX
CALCULATION UNIT
(550)

IMAGE INPUT UNIT
(530)

WARPING IMAGE
CONFIGURATION UNIT
(560)

FIG. 5

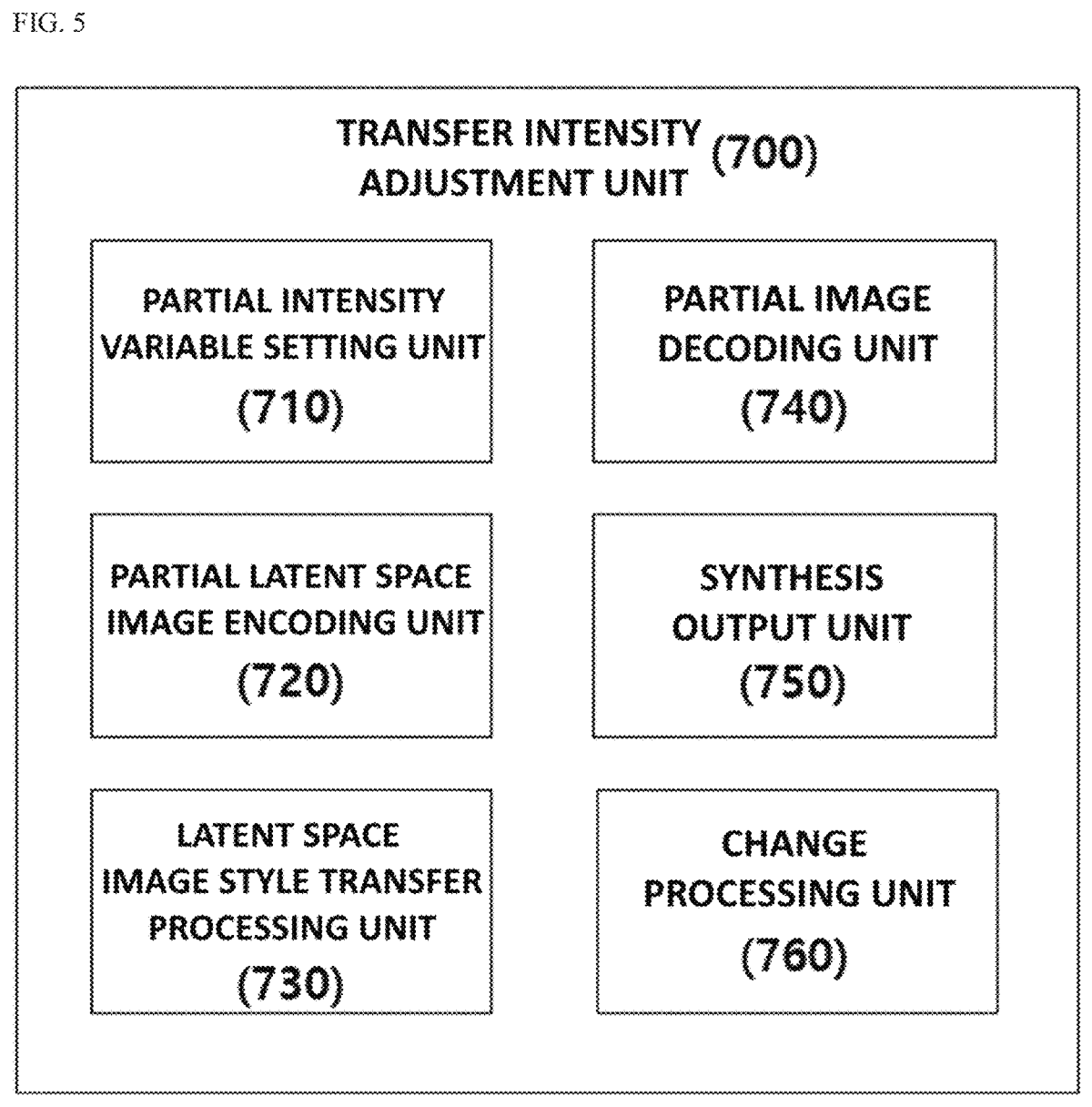

TRANSFER INTENSITY ADJUSTMENT UNIT (700)

PARTIAL INTENSITY VARIABLE SETTING UNIT (710)

PARTIAL IMAGE DECODING UNIT (740)

PARTIAL LATENT SPACE IMAGE ENCODING UNIT (720)

SYNTHESIS OUTPUT UNIT (750)

LATENT SPACE IMAGE STYLE TRANSFER PROCESSING UNIT (730)

CHANGE PROCESSING UNIT (760)

FIG. 6

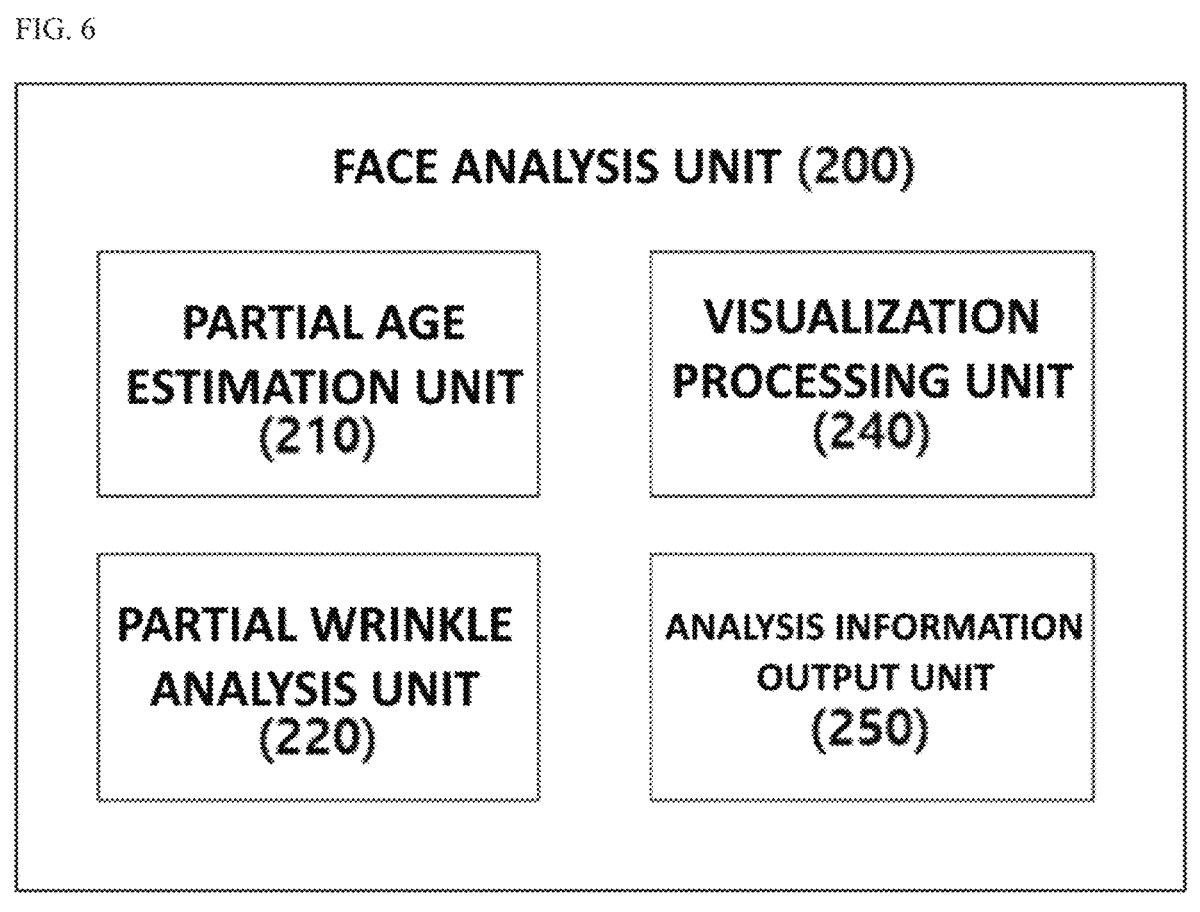

FACE ANALYSIS UNIT (200)

PARTIAL AGE
ESTIMATION UNIT
(210)

VISUALIZATION
PROCESSING UNIT
(240)

PARTIAL WRINKLE
ANALYSIS UNIT
(220)

ANALYSIS INFORMATION
OUTPUT UNIT
(250)

FIG. 11

**MAKEUP STYLE RECOMMENDATION
BASED ON FACIAL ANALYSIS**

BEAUTY YOUTUBER WHOSE FACIAL FEATURE
IS MOST SIMILAR TO YOURS WHEN ANALYZED
FROM YOUR PHOTO BEFORE MAKEUP : PONY

IT WAS ANALYZED THAT YOU AND PONY HAVE HIGH SIMILARITY IN FACIAL FEATURE BEFORE MAKEUP.
FIND AND RECEIVE RECOMMENDATION FOR MAKEUP METHOD THAT SUITS YOU FROM LINK BELOW.

>> GO TO BEAUTY YOUTUBER SITE

USER IMAGE    SYNTHESIS IMAGE    SOURCE IMAGE

FIG. 12

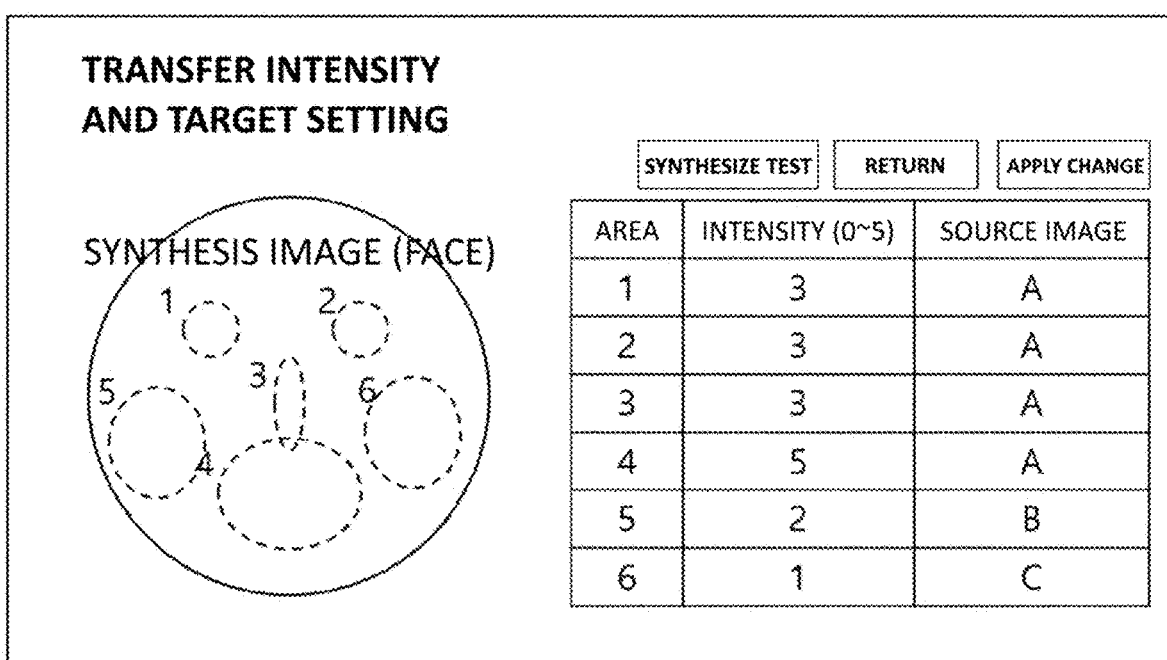

**TRANSFER INTENSITY
AND TARGET SETTING**

SYNTHESIS IMAGE (FACE)

| SYNTHESIZE TEST | RETURN | APPLY CHANGE |

| AREA | INTENSITY (0~5) | SOURCE IMAGE |
|------|-----------------|--------------|
| 1 | 3 | A |
| 2 | 3 | A |
| 3 | 3 | A |
| 4 | 5 | A |
| 5 | 2 | B |
| 6 | 1 | C |

ARTIFICIAL INTELLIGENCE VIRTUAL MAKEUP METHOD AND DEVICE USING MULTI-ANGLE IMAGE RECOGNITION

TECHNICAL FIELD

The present invention relates to a service providing device and method, and more particularly, to an artificial intelligence virtual makeup method and device using multi-angle image recognition processing technology.

BACKGROUND ART

With the development of the beauty industry, there has been a growing interest in users for cosmetics and makeup. Accordingly, users' needs for cosmetics, makeup, etc., are becoming more diverse. For example, due to variations in skin color, facial shape, and features, the makeup that suits each individual may be different. Therefore, users may have difficulty in choosing a makeup style that suits them personally. In addition, after applying makeup, users may be curious about whether their makeup is well-done and what areas need to be improved.

According to this trend, applications that apply virtual makeup to the user's face have recently been developed. In this case, such applications can arouse the user's curiosity and interest, but there is a limitation in that the individual needs to determine which make-up is suitable for the user. In other words, the current beauty services do not include collaboration with makeup experts, or even if there is collaboration with makeup experts, the beauty services are based on limited data. Therefore, it is difficult to provide customized services to individual users.

To solve these difficulties, makeup evaluation technology that uses machine learning and deep learning technology to process patterned image analysis has been proposed. The makeup evaluation technology is being proposed as a service that evaluates the results of one's makeup by applying scored criteria according to users' evaluations to makeup for customized services.

However, existing technologies merely allow users to evaluate their makeup results or directly find facial styles similar to the users. The existing technologies do not thoroughly identify styles that suit the user's face, nor do they provide various style recommendation services based on the comparisons with the identified analysis information.

In addition, applications that synthesize styles using makeup style transfer technology to style the face have been proposed, but their performance and efficiency are not high enough to be used as a commercialized style recommendation service. In general, makeup style transfer technology based on generative adversarial network (GAN) is known, but significant errors occur because it is dependent on a difference between a target face and an input image.

DISCLOSURE

Technical Problem

The present invention is directed to providing a service providing device and a method of operating the same, which extract and map style information from a face warped image based on source images to construct a database and provide a personalized style recommendation service according to style comparison processing based on virtual style synthesis and analysis using the constructed database so as to improve user convenience and provide a highly satisfying service with high accuracy.

Technical Solution

One aspect of the present invention provides a method of operating a service providing device, including: collecting a source image and processing face warping of the collected source image to transform the collected source image into a warping image based on a benchmark image; constructing, using the face warped source image, a style database to which style information of the source image is mapped; and providing a style recommendation service based on style transfer using the style database.

Another aspect of the present invention provides a method of operating a service providing device, including: performing virtual style synthesis based on style transfer between a user image and a source image; and providing a style recommendation service based on the virtual style synthesized image, wherein the performing of the virtual style synthesis includes adjusting transfer intensity of the style transfer for each partial area of the image.

Still another aspect of the present invention provides a method of operating a service providing service, including: performing virtual style synthesis based on style transfer between a user image and a source image; and providing a style recommendation service based on one or more synthesis images on which the virtual style synthesis has been performed, wherein the providing of the style recommendation service includes extracting analysis information for each partial area corresponding to the user image and providing style recommendation service information according to style comparison processing based on the one or more synthesis images and the analysis information for each partial area.

Yet another aspect of the present invention provides a service providing device including: a face warping processing unit configured to collect a source image and process face warping of the collected source image to transform the collected source image into a warping image based on a benchmark image; a style database to which style information of the source image is mapped, using the face warped source image; and a service providing unit configured to provide a style recommendation service based on style transfer using the style database.

Yet another aspect of the present invention provides a service providing device including: a virtual style synthesis unit configured to perform virtual style synthesis based on style transfer between a user image and a source image; and a service providing unit configured to provide a style recommendation service based on the virtual style synthesized image, and further including a transfer intensity adjustment unit configured to adjust transfer intensity of the style transfer performed in the virtual style synthesis unit for each partial area of the image.

Yet another aspect of the present invention provides a service providing device including: a virtual style synthesis unit configured to perform virtual style synthesis based on style transfer between a user image and a source image; and a service providing unit configured to provide a style recommendation service based on one or more synthesis images on which the virtual style synthesis has been performed, further including an analysis unit configured to extract analysis information for each partial area corresponding to the user image, wherein the service providing unit provides style recommendation service information according to style comparison processing based on the one or more synthesis images and the analysis information for each partial area.

Yet another aspect of the present invention provides a method that can be implemented as a computer program for executing the method on a computer and a computer-readable recording medium on which the program is recorded.

Advantageous Effects

According to a service providing device and a method of operating the same according to an embodiment of the present invention, it is possible to extract and map style information from a face warped image based on source images to construct a database and provide a personalized style recommendation service according to style comparison processing based on virtual style synthesis and analysis using the constructed database, thereby improving user convenience and providing a highly satisfying service with high accuracy.

In addition, according to an embodiment of the present invention, when a user inputs only his/her face image, synthesis images can be recommended according to image transfer with an appropriate source image based on virtual style synthesis and face analysis in which face warping is performed and transfer intensity is adjusted, and related makeup style information can be provided, thereby allowing a user to conveniently select makeup styles.

DESCRIPTION OF DRAWINGS

FIG. 4 is a block diagram illustrating a face warping processing unit in more detail according to an embodiment of the present invention.

FIG. 5 is a block diagram illustrating a transfer intensity adjustment unit in more detail according to an embodiment of the present invention.

FIG. 6 is a block diagram illustrating a face analysis unit in more detail according to an embodiment of the present invention.

FIGS. 8 to 12 are diagrams illustrating style interface output information in a user terminal according to an embodiment of the present invention.

MODES OF THE INVENTION

Figure 1:
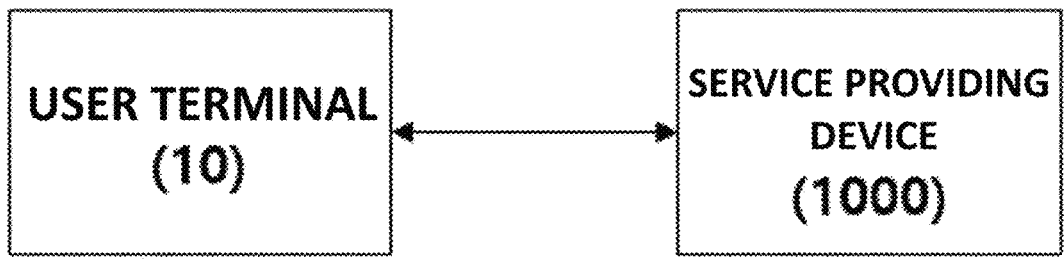
FIG. 1 is a conceptual diagram schematically illustrating the entire system according to an embodiment of the present invention.

The following description exemplifies only the principles of the present invention. Even if they are not described or illustrated clearly in the present specification, one of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions described in the specification.

In addition, all the detailed descriptions on the principles, viewpoints and embodiments and particular embodiments of the present invention should be understood to include structural and functional equivalents to them. The equivalents include not only currently known equivalents but also those to be developed in the future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of the term "processor," "control," or similar concept should not be understood to exclusively refer to a piece of hardware capable of running software, but should be understood to include a digital signal processor (DSP), hardware, and a read-only memory (ROM), a random access memory (RAM), and a non-volatile memory for storing software, implicatively. Other known and commonly used hardware may be included therein, too.

In the claims of the present specification, an element expressed as a means for performing a function described in the detailed description is intended to include all methods for performing the function including all formats of software, such as combinations of circuits for performing the intended function, firmware/microcode and the like. To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

The advantages, features and aspects of the invention will become apparent from the following description of the embodiments with reference to the accompanying drawings, which is set forth hereinafter. If further detailed description in the related arts is determined to obscure the point of the present invention, the description is omitted. Hereafter, exemplary embodiments of the present invention will be described in detail with reference to the drawings.

Hereinafter, exemplary embodiments according to the present invention will be described in detail with reference to the attached drawings.

FIG. 1 is a conceptual diagram schematically illustrating the entire system according to an embodiment of the present invention.

The entire system for providing advertisements according to the embodiment of the present invention may include a user terminal 10 and a service providing device 1000.

In particular, the service providing device 1000 may be connected to the terminal 10 through a wired/wireless network and mutually communicate with the terminal 10 in order to provide a makeup style recommendation service according to an embodiment of the present invention.

Here, each of the networks may be implemented as any type of wired/wireless network such as a local area network (LAN), a wide area network (WAN), a value added network (VAN), a personal area network (PAN), a mobile radiocommunication network, or a satellite communication network.

In addition, the user terminal 10 may be any one individual device of a computer, a mobile phone, a smartphone, a smart pad, a laptop computer, or personal digital assistants (PDAs), or at least one multi-device among common devices such as a kiosk or stationary display device installed in a specific location. The user terminal 10 may provide user information to the service providing device 1000 and receive and output processed information from the service providing device 1000.

In such a system configuration, the service providing device 1000 may collect source images for configuring a style database, process face warping of the collected source images to transform the collected source images into a warping image based on a benchmark image, and construct a style database in which style information of the source image is mapped, using the face warped source image.

In response to the content of the user image, the style information according to an embodiment of the present invention may include visual style change information that changes the visual style of the entire image while maintaining the content. This style information is the visual style change information extracted by a deep learning algorithm corresponding to the source image and includes, for example, a style vector. Here, the style vector may include vector information indicating whether to apply an image property change function corresponding to one or more partial positions for changing the visual style, and the image property change function may include visual experience-based functions that apply the texture, color, sharpness, illuminance, or other various visual element functions of the image in combination.

In particular, the style information according to the embodiment of the present invention may preferably be classified according to a makeup style based on a predetermined classification criterion, and the source image for the style information may include facial images with completed makeup. Accordingly, the style information may include visual style change information capable of changing only the visual style of visual elements according to the makeup style while maintaining the content of the user image by applying a desired makeup style to the user image. The visual style change information may include style vector information indicating processing of one or more image property change functions.

Here, image information corresponding to the source image may be collected through a network or acquired from various videos and images input from a separate device and may include image information acquired from beauty-related videos or images. The image information corresponding to the source image may include area image information from which style information corresponding to the makeup style can be extracted. The area image information corresponding to the makeup style may include at least one of the entire area image information of the face with makeup, a partial area image with makeup, or a combination thereof.

For example, the beauty-related video or image information may be makeup video or image information of beauty influencers with a certain number of subscribers or followers, and include video or image information crawled and extracted from various video upload sites such as Instagram, TikTok, YouTube, Facebook, Tumblr, Twitch, Naver, and Kakao.

Next, the service providing device 1000 may acquire source images corresponding to the collected video or image information, and the source images may include, for example, a makeup style example image, a pre-makeup image of a specific influencer, a post-makeup image of a specific influencer, and the like.

Accordingly, the service providing device 1000 may determine style information based on the source image, and for this purpose, image analysis technology based on a pre-learned style neural network model may be used. Here, the image analysis technology may be, for example, a technology that vectorizes style-specific information by applying an image to a learning model.

Next, the service providing device 1000 may construct a style database by mapping and registering the source image and source image identification information corresponding to the determined style information.

Meanwhile, the service providing device 1000 may receive and register user information from the user terminal 10, acquire a user image and other condition setting information as user input information, and provide recommendation information for recommending a suitable style in response to the user image to the user terminal 10. Here, the user image may be image information input or uploaded by the user and may be an original image on which style transfer is to be performed. This user image may include at least one of various images input by the user to process style transfer, such as the user's face image, the user's full body image, the user's interior image, the user's building image, and the like.

To this end, the service providing device 1000 may perform virtual style synthesis processing, face analysis, and style comparative analysis processing corresponding to the user image, and provide one or more pieces of style information, virtual synthesis result information, or face analysis information to the user terminal 10.

In particular, image synthesis technology based on style transfer, which can synthesize the user image and the source image, can be used in virtual style synthesis processing. Here, the style transfer technology processed in the present invention may use the currently known BeautyGAN (instance-level facial makeup transfer with deep generative adversarial network) technology or PairedCycleGAN (asymmetric style transfer for applying and removing makeup) technology as is, or according to an embodiment of the present invention, a complex GAN learning model that combines the BeautyGAN and PairedCycleGAN technologies may be used.

In the complex GAN learning model according to an embodiment of the present invention, the learning process itself corresponding to makeup style transfer may use the process of the PariedCycleGAN model and only a loss function part may be replaced with a function defined in BeautyGAN, thereby improving the overall synthesis performance and subjective image quality effect. This can improve the performance in transferring the style of the makeup image to a non-makeup image, and in particular, by the face warping process according to the embodiment of the present invention, the naturalness in the transfer based on the warped image can be improved.

Meanwhile, as the user terminal 10 transmits user information including the user image to the service providing device 1000, a style recommendation interface based on style recommendation service information received as a response from the service providing device 1000 may be output to provide the style recommendation service information to the user.

In particular, the user terminal 10 may receive recommendation service information including style information, virtual synthesis result information, or face analysis information from the service providing device 1000 through a makeup style recommendation service application, etc., and output the received recommendation service information through an interface.

For example, the user terminal 10 may recommend images where the predicted age of aged parts is improved according to facial analysis, images with similar facial shapes and wrinkles, or images of a specific style in which the user inputs transfer intensity adjustment among virtual synthesis images in which the style of an influencer is synthesized with the input bare face image of the actual user. Among these, at least one of influencer video information, cosmetics recommendation information, or purchase link information may be output as makeup style information corresponding to the user-selected image.

Accordingly, according to an embodiment of the present invention, the user can conveniently select the makeup styles of famous influencers through the recommendation service, generate new demands and greatly improve service accessibility and convenience.

In particular, in order to provide such services, the service providing device 1000 according to the embodiment of the present invention may construct the style database based on a virtual style synthesis neural network for ultimately recommending the optimal style for the user's face in virtual style synthesis and analysis, adjust the intensity of the transfer, and perform face analysis processing in a circular manner, which will be described in more detail below.

Figure 2:
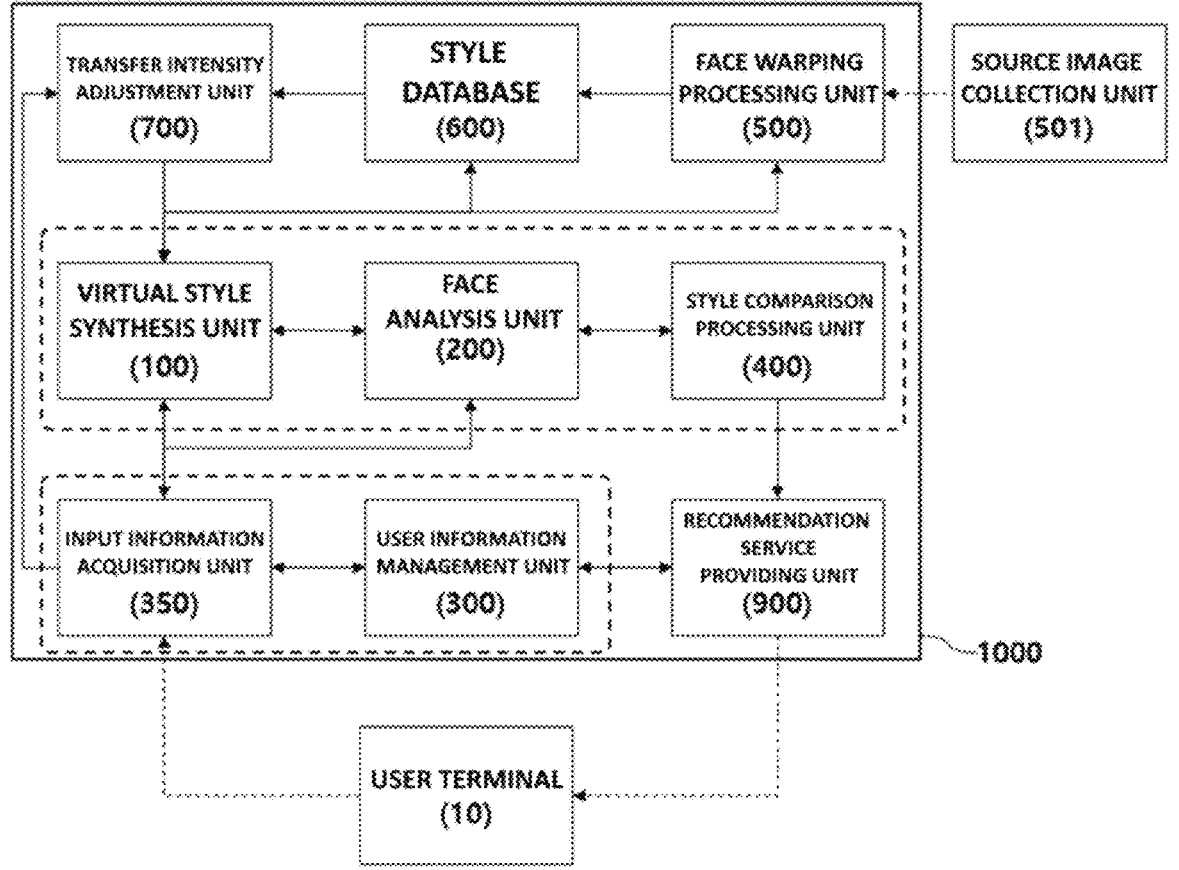
FIG. 2 is a block diagram illustrating a service providing device in more detail according to an embodiment of the present invention.

FIG. 2 is a block diagram illustrating a service providing device in more detail according to an embodiment of the present invention.

Referring to FIG. 2, a service providing device 1000 according to the embodiment of the present invention includes a virtual style synthesis unit 100, a face analysis unit 200, a user information management unit 300, an input information acquisition unit 350, a face warping processing unit 500, a source image collection unit 501, a transfer intensity adjustment unit 700, a style database 600, a style comparison processing unit 400, and a recommendation service providing unit 900.

First, the face warping processing unit 500 collects image information corresponding to a source image for constructing the style database 600 from various video and image information collected from the source image collection unit 501.

As described above, the image information corresponding to the source image may be acquired from various paths, for example, from makeup video information of beauty influencers with a certain number of subscribers or more. The image information corresponding to the source image may include video and image information crawled and extracted from various video upload sites such as Instagram, YouTube, Facebook, Tumblr, Twitch, Naver, and Kakao.

For example, to collect video information, the source image collection unit 501 may crawl and capture a source person image (post-makeup image in an Internet beauty video showing before and after makeup) and a source person pre-makeup image, respectively. The style database 600 may be constructed through neural network learning using images subjected to face warping on the captured images by the face warping processing unit 500.

Accordingly, the style database 600 may store and manage the database constructed from the face warped image of the source image, and provide style information and source images in response to a request from the virtual style synthesis unit 100.

Meanwhile, the user information management unit 300 may perform registration processing of user registration information according to input information input from the user terminal 10, and, in response to the registered user information, map, store, and manage user's usage history information according to the use of the style recommendation service, usage history information of a user group with similar user registration information, user preference information for the style recommended by the style recommendation service, and the like.

In addition, the user information management unit 300 may perform profiling (feature analysis) using face photos, user type classification through beauty score evaluation and feedback, profiling (collaborative filtering) through similar user clusters, and profiling through service usage patterns, thereby constructing data for recommendation services.

The input information acquisition unit 350 may acquire style synthesis input information for selecting a style synthesis image to be recommended according to the user registration information managed by the user information management unit 300 and the user style input information input from the user terminal 10.

For example, the user terminal 10 may transmit the user terminal 10 services user style input information including the user's face image (before or after makeup), age information, keyword information (search, filtering, recommendation), transfer intensity setting information, etc., to the service providing device 1000, the service providing device 1000 may determine style synthesis input information based on the received user style input information and the user registration information managed in the user information management unit 300, and the determined input information may be transmitted to the virtual style synthesis unit 100, the transfer intensity adjustment unit 700, or the face analysis unit 200.

The virtual style synthesis unit 100 may perform virtual synthesis processing on the source image acquired from the database 600 and the user image one or more times according to style information determined based on predetermined condition information according to the user image and the style synthesis input information.

To this end, the virtual style synthesis unit 100 may perform image synthesis processing between the source image for each makeup style and the user image through artificial neural network learning processing, and for this purpose, a process of extracting a makeup style application portion from the source image and applying the extracted makeup style application portion to the user image may be performed.

In particular, the unsupervised learning method of the paired cycle competitive generative network method (PairedCycleGAN) can be used to construct this neural network, and in particular, the BeautyGAN method, which applies the GAN specialized for makeup transfer, can be used in parallel. The generative adversarial network (GAN) method is a network that generates images using deep learning and trains two different neural networks, D (Discriminator) and G (Generator), to compete between a well-performing discriminator network and a generator network that deceives the discriminator, thereby maximizing the learning effect.

In addition, the PairedCycleGAN: Asymmetric Style Transfer for Applying and Removing Makeup (Huiwen Chang, Jingwan Lu, Fisher Yu, Adam Finkelstein; Proceedings of the IEEE Conference on Computer Vision and Pattern Recognition (CVPR), 2018, pp. 40-48) is proposed as a method of processing makeup transfer or style transfer by applying this to virtual makeup synthesis. Through this, it is possible to achieve a natural virtual makeup synthesis effect by competitively training a pair of a virtual makeup (virtual makeup synthesis) network and a makeup removal network and complementing each other's performance.

Furthermore, in the BeautyGAN (BeautyGAN: Instance-Level Facial Makeup Transfer with Deep Generative Adversarial Network (Tingting Li, Ruihe Qian, Chao Dong, Si Liu, Qiong Yan, Wenwu Zhu, Liang Lin, MM'18: Proceedings of the 26th ACM International Conference on Multimedia (October 2018, pp. 645-653), normalization is performed using the known ResNet architecture, and GAN-based makeup transfer with improved performance is processed by applying patch GANs that perform local fake classification of overlapping images.

According to an embodiment of the present invention, for more natural and rapid synthesis, the virtual style synthesis unit 100 may construct a complex GAN model that uses the loss function of the BeautyGAN model only for the loss function while applying the above PairedCycleGAN method as a basic model constructing process, and perform a style transfer learning process for images based on this.

In particular, the style transfer learning process according to an embodiment of the present invention may be performed in response to images warped by the face warping processing unit 500, thereby preventing errors occurring in the GAN models in advance and enabling natural image synthesis. Face warping was designed to solve problems that occur when the positions corresponding to specific facial areas between the user image and the source image do not match each other. The virtual style synthesis unit 100 may confirm whether the face warping process of the face warping processing unit 500 is applied, adjust the positions of partial areas of the face to match each other according to the face warping process that has been confirmed to be applied, and then perform style transfer to achieve natural synthesis.

In addition, the face warping processing unit 500 may perform face reverse warping processing corresponding to the virtual synthesis image subjected to style transfer by the virtual style synthesis unit 100, so that the face direction and position of the existing user image are restored. As a result, the virtual style synthesis unit 100 may output more natural virtual synthesis image result data as the reverse warped image. A more detailed face warping process will be described with reference to FIG. 4.

Meanwhile, the face analysis unit 200 may perform face analysis corresponding to the user image or the virtual synthesis image and output face analysis information. The face analysis information may be provided directly to the user terminal 10 through the recommendation service providing unit 900 or may be transmitted to the style comparison processing unit 400.

Here, the face analysis information may include age estimation information obtained by applying the facial partial area image corresponding to the user image to one or more pre-trained artificial neural network learning models. In this case, the recommendation service providing unit 900 may provide style recommendation service information including age analysis information for each facial area based on the age estimation information to the user terminal 10.

In addition, the face analysis information may include wrinkle feature information obtained by applying the facial partial area image corresponding to the user image to the one or more pre-trained artificial mountain neural network learning models. In this case, the recommendation service providing unit 900 may provide style recommendation service information including wrinkle analysis information for each facial area based on the wrinkle feature information to the user terminal 10.

In addition, the style comparison processing unit 400 may compare the results of facial analysis on one or a plurality of virtually synthesized synthesis images corresponding to the facial analysis information of the user image to select virtual synthesis images to be provided from the recommendation service providing unit 900.

For example, the style comparison processing unit 400 may identify a facial partial area that is higher than a user input age by a first threshold or higher according to the age analysis information, acquire a synthesis image with the lowest age estimation information for the identified facial partial area among the one or more synthesis images, and configure style recommendation service information to be provided to the user terminal 10 based on the synthesis image with the lowest age estimation information.

The recommendation service providing unit 900 may configure the style recommendation service information and provide the same to the user terminal 10 based on at least one of the synthesis image of the virtual style synthesis unit 100, the face analysis information of the face analysis unit 200, and the comparison information of the style comparison processing unit 400.

In addition, the recommendation service providing unit 900 may provide various additional services, such as an estimation recommendation service for each user type based on user profiling and a recommendation service that maximizes the beauty score. Here, the beauty score may indicate an evaluation score corresponding to the style synthesis image, and include score information indicating, for example, whether the makeup was done well after makeup or whether supplementation is needed, for the entire face or by partial area. These beauty scores can be calculated based on learning data of information determined by beauty experts or users depending on the proportion and location of the entire makeup face or the makeup facial area.

In addition, the recommendation service providing unit 900 may provide influencer video information linked by the recommendation service and a cosmetics recommendation and purchase linking process.

Based on the face analysis information, the recommendation service providing unit 900 may index people with a style that can improve the user's face for each facial area, and provides a service that indexes a specific influencer and automatically recommends the influencer's makeup as a makeup style suitable for the user.

Meanwhile, the recommendation service providing unit 900 may provide a cosmetics recommendation service that constructs a matching database for matching images and cosmetics using a deep learning method and identifies and outputs information on cosmetics used in the input photo. For example, the recommendation service providing unit 900 may provide a recommendation service that performs a deep learning process that matches the tone of cosmetics extracted from the photo image with the actual tone of cosmetics, identifies cosmetics information corresponding to the photo input from the user, and provides the identified cosmetics information to the user terminal 10.

Meanwhile, the transfer intensity adjustment unit 700 may perform an adjustment process to adjust the transfer intensity of the style transfer for each partial area of the image according to the user input corresponding to the virtual synthesis image provided through the recommendation service providing unit 900.

Here, the transfer intensity indicates the extent to which style transfer is applied and may be an intensity indicating the extent to which the makeup style is applied to each area of the user's image. The transfer intensity may be numerical information that allows the user to set the makeup style intensity for each partial area of the desired image. The user may receive services of reflecting the level of makeup for the area desired by the user according to the transfer intensity setting, for example, reflecting the makeup synthesis of darkened or lightened eye makeup, reflecting the makeup synthesis of darkened or lightened mouth makeup, or reflecting the makeup synthesis of darkened or lightened base makeup of the entire face darkly or lightly. As a result, it is possible to improve convenience, diversification of choice, and satisfaction with service use in providing recommendation services based on personalized synthesis of various styles.

For this purpose, the transfer intensity adjustment unit 700 may determine a transfer intensity variable and a source image for each facial area corresponding to the user input, and thus, the determined transfer intensity variable for each facial area and source image identification information may be transmitted to the virtual style synthesis unit 100. The virtual style synthesis unit 100 may generate a style transfer image in which the user image and the source image are recombined according to the transfer intensity variable for each facial area, and provide the generated style transfer image to the user terminal 10 through the recommendation service providing unit 900.

The transfer intensity variable for each facial area may include at least one the facial area information, image information corresponding to a target source image, and transfer weight information, and a user setting interface corresponding thereto may be output through the user terminal 10. Here, the specific process will be described below.

Figure 3:
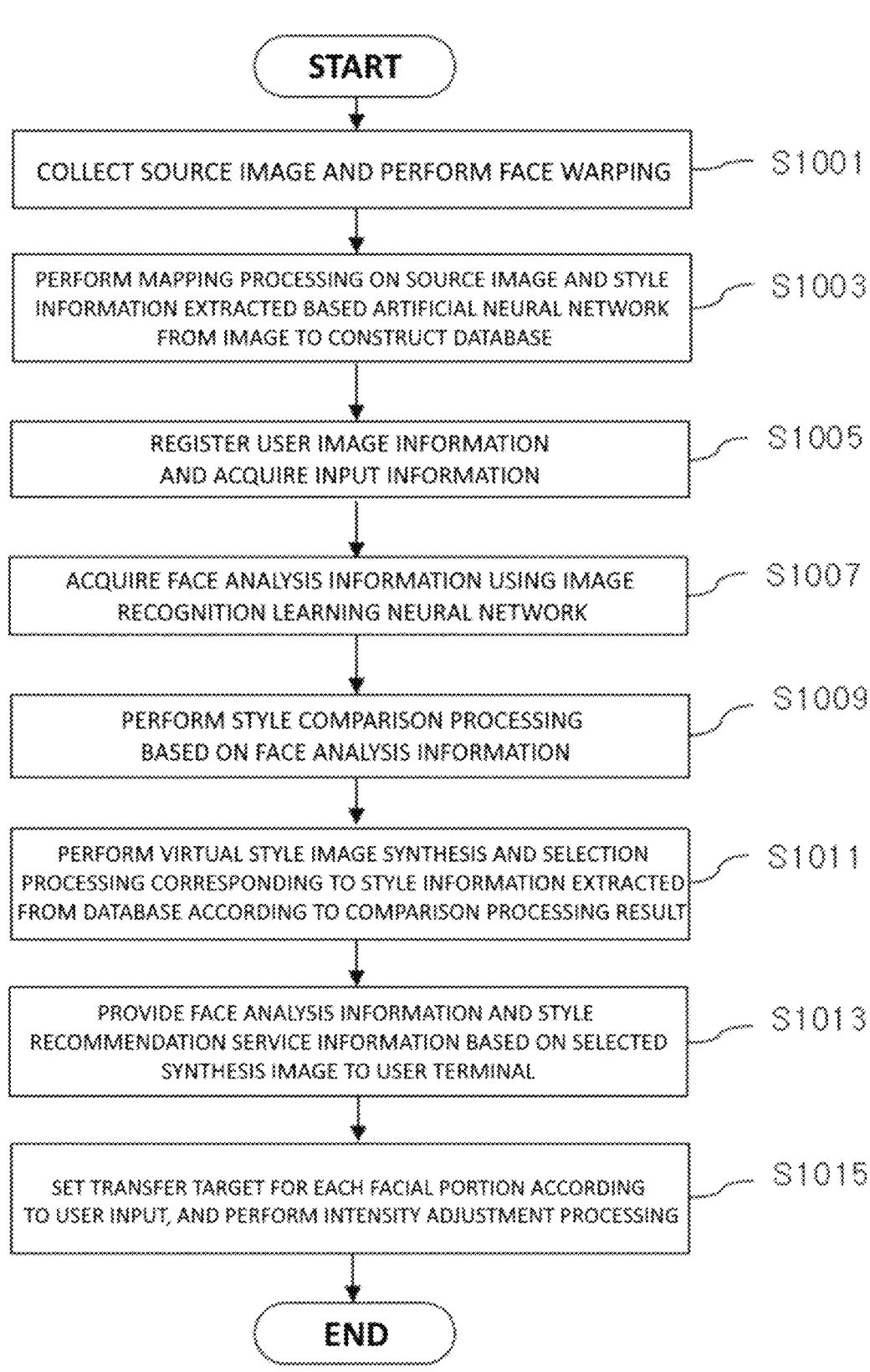
FIG. 3 is a flowchart illustrating a service providing method according to an embodiment of the present invention.

FIG. 3 is a flowchart illustrating a service providing method according to an embodiment of the present invention.

Referring to FIG. 3, the service providing device 1000 according to the embodiment of the present invention first collects source images to perform face warping in operation S1001, and performs mapping processing on the collected images and style information extracted based on an artificial neural network from the images to construct a database 600 in operation S1003.

To this end, the service providing device 1000 may crawl and capture style images from various beauty videos or images on the network through the source image collection unit 501.

Next, the service providing device 1000 may process face warping of the face warping processing unit 500 on the processed image.

Accordingly, the service providing device 1000 may perform an artificial neural network learning process for mapping style information to the face-warped source image to construct the style database 600.

For example, the service providing device 1000 may determine the style information based on the face-warped source image, and for this purpose, use image analysis technology based on a pre-learned style neural network. For example, the style information may include style-specific vectors extracted by applying the source image to an image style neural network.

Next, the service providing device 1000 may map, store, and register source image identification information corresponding to the determined style-specific vector to construct the style database.

Next, the service providing device 1000 may register user information received from the user terminal 10 through the user information management unit 300, and acquire input information in response to a request from the user terminal 10 in operation S1005.

Next, the service providing device 1000 may acquire face analysis information based on the user information and the user image in operation S1007, perform style comparison processing based on the acquired face analysis information in operation S1009, and perform virtual style image synthesis and selection processing corresponding to the style information extracted from the database 600 according to the comparison processing result in operation S1011.

Here, the face analysis information may include at least one of style information of the user image, age estimation information for each facial portion, and wrinkle feature information.

In addition, for example, the style comparison processing may include a comparison processing between a makeup style specific vector extracted from the user image and a makeup style feature vector obtained from one or more source images. Here, the makeup style feature vector may include vector information representing one or more makeup methods applied to the image. For example, the makeup style feature vector may represent the style of each portion corresponding to eye shadow, blush, eyeliner, mascara, lipstick, contouring, etc., and also represent a set of already known makeup styles corresponding to famous celebrities, etc.

In addition, the style comparison processing may include comparison processing between age estimation information for each facial portion of the user image and age estimation information for each facial portion analyzed in the synthesis image with one or more source images, or comparison processing between wrinkle feature information of the user image with wrinkle feature information analyzed in the synthesis image of the one or more source images.

To this end, the service providing device 1000 may perform learning processing of a plurality of face analysis models for analysis, and compare the results of applying the learned models to perform selection processing for the synthesis image to be provided to the user terminal 10 among the synthesis images.

Next, the service providing device 1000 may provide, to the user terminal 10, a style recommendation service based on the face analysis result and the synthesis image according to the face analysis result through the recommendation service providing unit 900 using the face analysis information and the selected synthesis images in operation S1013.

Meanwhile, the service providing device 1000 may perform intensity adjustment processing on a transfer target for each facial portion corresponding to the synthesis image recommended according to the user input in operation S1015, which will be processed by the transfer intensity adjustment unit 700.

FIG. 4 is a block diagram illustrating a face warping processing unit in more detail according to an embodiment of the present invention.

Referring to FIG. 4, the face warping processing unit 500 according to the embodiment of the present invention includes a benchmark image setting unit 510, a triangulation processing unit 520, an image input unit 530, a landmark identification unit 540, a transformation matrix calculation unit 550, and a warping image configuration unit 560.

As described above, in the makeup style transfer method based on the existing GAN model, there are problems in that, when the positions of specific portions (eyes, nose, mouth, etc.) of the user image on which a user wants to perform style transfer and the source image with the desired makeup style do not match, the makeup transfer may not be performed properly, the makeup may move to an odd location, or the like.

To solve this problem, the face warping processing unit 500 according to the embodiment of the present invention may perform face warping processing for matching the face positions of the user image and the source image to ensure that makeup style transfer synthesis processing of the virtual style synthesis unit 100 is performed well without any error, and perform reverse warping processing on the synthesized image so that a natural synthesis result is output from the virtual style synthesis unit 100.

In addition, the face warping processing unit 500 may perform face warping processing of a neural network learning image, so that learning of the makeup transfer model can be performed more easily through learning using the aligned face image as the benchmark image, thereby constructing a learning model that allows makeup transfer to proceed smoothly even when the face in the user image is not properly aligned.

To this end, first, the benchmark image setting unit 510 may set a benchmark image that has been set in advance. The benchmark image may be an image in which the landmark positions of the face are evenly aligned, and may be pre-entered according to an administrator input and may be deleted after triangulation processing. Here, the landmark is reference coordinate information for indicating a feature point on an image, and include reference position information determined differently depending on the properties of the image. Typically, in the case of the face image, the landmark may consist of 68 pieces of predetermined reference position information corresponding to the pupil, eyebrows, nose, and jaw line, and the landmark may include coordinate information corresponding to the 68 pieces of reference position information identified from the image.

The triangulation processing unit 520 identifies landmark points corresponding to the benchmark image, performs triangulation processing corresponding thereto, and stores one or more pieces of triangle information determined according to the triangulation processing. More specifically, in the case of the above-described face image, triangulation processing may be performed in which 68 pieces of reference position information corresponding to the pupil, eyebrows, nose, and jaw line are identified and the coordinate information corresponding to the 68 pieces of reference position information are configured as a plurality of pieces of triangle data.

For example, the triangulation processing unit 520 may extract 68 landmark points at predetermined locations from the benchmark face image and perform triangulation to identify triangles connecting the landmark points.

Here, the triangulation processing is a method of dividing space by connecting landmark points into triangles, and Delaunay triangulation, which divides space so that the minimum value of the interior angles of the triangles is maximum, may be preferable. In the case of Delaunay triangulation, the circumcircle of any triangle can be provided to include no points other than the three vertices of the triangle. This triangulation processing can be useful in extracting meaningful clusters for data distribution, and is a technique used in face recognition, road network construction, etc.

According to this triangulation processing, a plurality of triangles sharing at least one landmark point may be formed.

The triangulation processing unit 520 may store location information about the points and triangles obtained as the result of triangulation.

Next, the image input unit 530 may receive a face warping target image to be face-warped. The face warping target image may be a user image, a source image, or a training image used for learning.

The landmark identification unit 540 extracts landmark point areas corresponding to the input image. The landmark point areas may correspond to point areas extracted from the benchmark face image.

The transformation matrix calculation unit extracts, from the face warping target image, first triangle information corresponding to a first triangle among the triangles obtained according to landmark point triangulation processing of the benchmark image and a partial area image of the input image corresponding to the first triangle information, and calculate a transformation matrix that transforms specific triangle information extracted from the partial area image into arrangement coordinates of the first triangle information.

Here, the inter-triangular transformation matrix can be a geometric transformation matrix that changes the shape of the entire image, such as translation, enlargement and reduction, and rotation, by changing the arrangement structure of pixels constituting the image, and a transformation matrix by the known affine transformation method may be exemplified. The affine transformation may be defined as a formula using a total of six parameters a, b, c, d, e, and f when the coordinates (x, y) of the input image move to the coordinates (x', y') of the result image.

$$x' = f(x, y) = ax + by + c \qquad\qquad \text{[Equation 1]}$$
$$y' = f(x, y) = dx + ey + f$$

The inter-triangular transformation matrix calculated in the same way as this affine transformation can be expressed as a 2×3 matrix in the middle that constitutes the transformation equation such as $$\begin{pmatrix} x' \\ y' \end{pmatrix} = \begin{pmatrix} a & b & c \\ d & e & f \end{pmatrix} \begin{pmatrix} x \\ y \\ 1 \end{pmatrix}.$$

To calculate this transformation equation, simultaneous equations corresponding to each of the three points in which the three position coordinates of the first triangle information are (x, y), and the three position coordinates of the specific triangle information are (x', y') are given. Here, when coefficients a, b, c, d, e, and f are calculated according to the simultaneous equations, the 2×3 matrix can be calculated as the transformation matrix described above. This transformation function may be a matrix function that transforms the pixel arrangement structure of the image into a geometric form such as translation, enlargement and reduction, rotation, etc., to transform the pixel arrangement structure of the image from the first triangle to the specific triangle, and may be a two-dimensional transformation matrix that can be applied to all geometric areas with different shapes.

Here, the partial area image may include a square area including a specific triangle area corresponding to the first triangle information among landmark point areas corresponding to the face warping target image.

The warping image configuration unit 560 generates a face warping output image and applies the transformation matrix corresponding to the entire partial area image to geometrically transform the face warping output image into a warped state.

In order to apply the transformation matrix to the partial area image, the warping image configuration unit 560 may extract a square image composed of the square area including a specific triangle area corresponding to the first triangle information from the partial area image, and perform geometric transformation processing by applying the transformation matrix to the extracted square image.

The warping image configuration unit 560 removes parts other than an area corresponding to the first triangle information from the transformed partial area image, and combines the partial area from which the parts other than the area corresponding to the first triangle information has been removed, to the output image. Accordingly, landmark-based geometrically transformed pixel data for performing virtual style synthesis more smoothly may be configured as the face warping output image.

To correspond to all triangles in each benchmark image, the processes of identifying the landmark of the input user image, calculating the transformation matrix, and configuring the warping image as described above are performed repeatedly, and as a result, according to the transformation matrix configured to correspond to the landmark portion of the benchmark image and the face warping target image, the face warping output image may be configured and output.

Meanwhile, the face warping processing unit 500 may perform reverse face warping processing by driving each processing unit as described above in reverse.

Accordingly, the synthesis process of the virtual style synthesis unit 100 may be performed as follows.

First, the virtual style synthesis unit 100 extracts a face area image corresponding to the user image and the source image.

Next, the virtual style synthesis unit 100 may align the user image and the source image so that the eye heights are the same by adjusting the face angle corresponding to the extracted face area image.

Next, the virtual style synthesis unit 100 transmits the aligned user image and source image to the face warping processing unit 500 to perform face warping based on the benchmark image.

Next, the virtual style synthesis unit 100 acquires a synthesis image in which the makeup style is synthesized by performing style transfer using the face warped user image and the source image.

Next, the virtual style synthesis unit 100 requests, from the face warping processing unit 500, to perform reverse warping processing corresponding to the synthesis image, and acquires the reverse warping-processed synthesis image from the face warping processing unit 500.

The virtual style synthesis unit 100 reversely readjusts the face angle according to the face angle adjustment to a position that matches the angle of the user image.

The virtual style synthesis unit 100 performs image synthesis processing, such as a known Poisson blending method, on the reversely adjusted synthesis image and the user image to acquire and output a virtual style synthesis image in which makeup style transfer to the user image is naturally performed.

FIG. 5 is a block diagram illustrating a transfer intensity adjustment unit in more detail according to an embodiment of the present invention.

Referring to FIG. 5, the transfer intensity adjustment unit 700 according to an embodiment of the present invention may freely set and adjust the transfer intensity and area of the style-transferred virtual synthesis image and its target according to user input. This can be processed by applying a GAN-based makeup transfer model.

For this purpose, the transfer intensity adjustment unit 700 uses a GAN-based model to construct an encoder that sends each input image to a latent space rather than directly outputting a makeup style transferred image from the two input images, sets a makeup style transfer transformation matrix W that extracts makeup style transfer information from the latent space, and performs transfer intensity adjustment processing by constructing a decoder that restores the makeup style transfer vector in the latent space back to the original image.

To implement this, the transfer intensity adjustment unit 700 includes a partial intensity variable setting unit 710, a partial latent space image encoding unit 720, a style transfer processing unit 730 of a latent space image, a partial image decoding unit 740, a synthesis output unit 750, and a change processing unit 760.

The partial intensity variable setting unit 710 may set the transfer intensity variable for each facial partial area and the transfer target source image according to the user input, respectively. For example, the transfer intensity variable can be a specific variable between 0 and 5, which can be converted into a weight value for the makeup style transfer operation.

The partial latent space image encoding unit 720 performs encoding processing to convert each of the user image and the source image into a latent space for each facial area. The latent space can be a specific space in which variables that are difficult to directly observe or measure are converted into vectors, etc., for machine learning.

The latent space image style transfer processing unit 730 applies the encoded user image and source image for each facial area as input images of the style transfer model, so that the style transfer of the latent space image is processed. Here, the transfer intensity variable may be applied as a weight value for each facial area.

For example, in the latent space, when the encoded vectors corresponding to the face part of the user image for makeup and the face part of the target source image are $v1$ and $v2$, respectively, the style transfer model matrix is W, the unit matrix is I, and the transfer intensity weight is t ($0 <= t <= 1$), a latent space vector obtained through mathematical equation such as $(1-W)*v1+t*W*v2$ may be the output of the latent space image style transfer processing unit 730.

The partial image decoding unit 740 may perform an operation of inversely calculating the latent space vector and decoding it into partial image information.

In addition, the synthesis output unit 750 may synthesize the decoded partial image information and transmit the reconfigured synthesis image according to the transfer intensity setting to the virtual style synthesis unit 100.

The change processing unit 760 may re-perform the change processing of the transfer intensity information and source information described above according to a user change setting input corresponding to the reconfigured synthesis image.

In this way, the operation of the transfer intensity adjustment unit 700 can be subdivided and applied to each different facial area (eyes, mouth, skin, etc.), and each area may be overlapped according to the user change setting input. In addition, different person's makeup styles corresponding to each part style may be individually applied, and as described above, complex different source images can be applied to each part to improve the partial age of the face.

For example, the transfer intensity adjustment unit 700 sets the makeup style transformation matrices W eye, W_lip, and W_skin, respectively, sets different source images for each partial makeup corresponding thereto, and configures each transfer intensity to be adjusted. In this case, the encoded vector v1 of the user image, the encoded vector v2 of the source image, and weight t of the source image are subdivided into eye, lip, and skin parts, and the following operations can be processed.

$$v1\_out = (I - W\_eye - W\_lip - W\_skin) * v1 + t\_eye * W\_eye * v2\_eye +$$
$$t\_lip * W\_lip * v2\_lip + t\_skin * W\_skin * v2\_skin$$

or $$v1\_out = (I - W\_skin) *$$
$$((I - W\_lip) * ((I - W\_eye) = v1 + t\_eye * W\_eye * v2\_eye) +$$
$$t\_lip * W\_lip * v2\_lip) + t\_skin * W\_skin * v2\_skin$$

Figure 7:
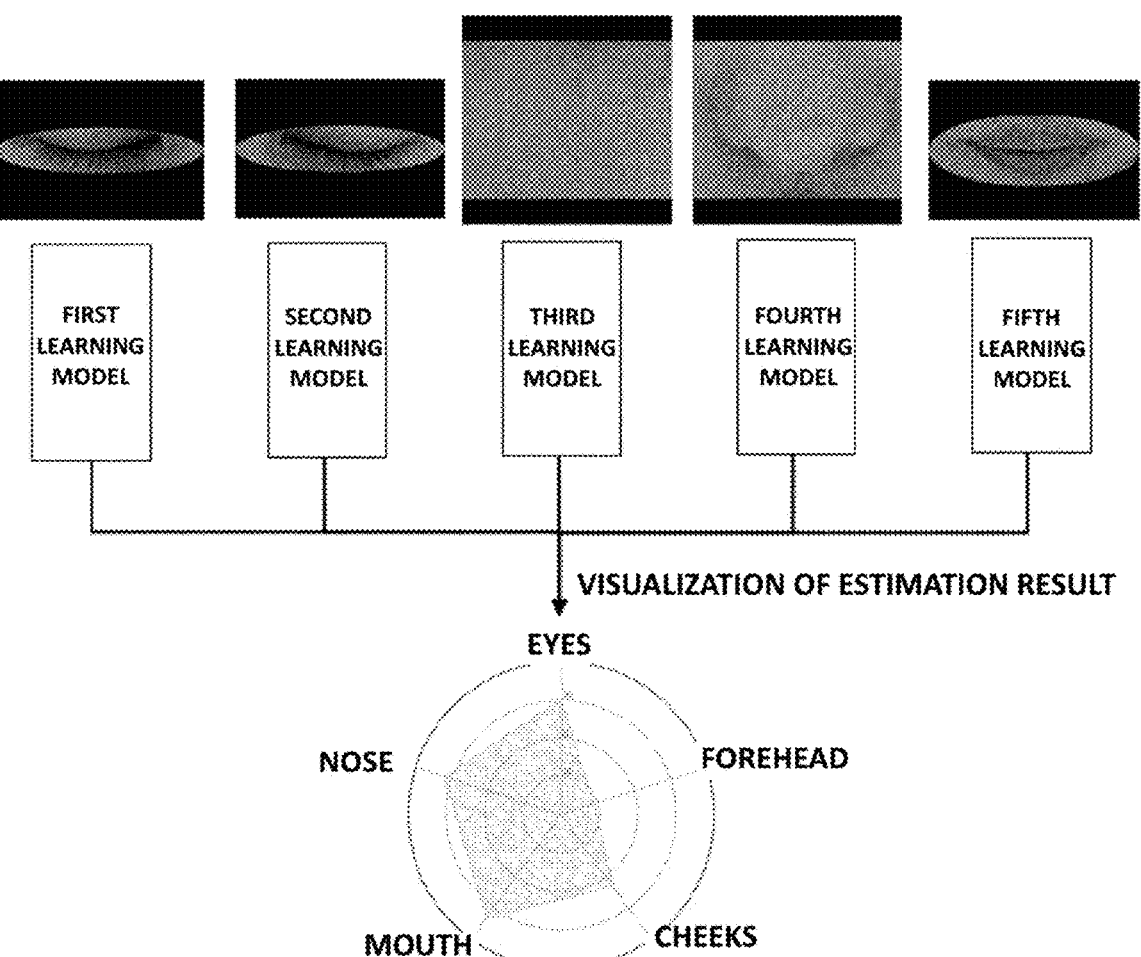
FIG. 7 is a diagram illustrating a facial partial age estimation model and visualization process according to an embodiment of the present invention.

FIG. 6 is a block diagram illustrating a face analysis unit in more detail according to an embodiment of the present invention, and FIG. 7 is a diagram illustrating a facial partial age estimation model and visualization process according to an embodiment of the present invention.

Referring to FIG. 6, the face analysis unit 200 according to an embodiment of the present invention may extract analysis information for each facial partial area corresponding to the user image or synthesis image, and this analysis information for each facial partial area may facilitate style comparison and can be used to configure style recommendation service information more effectively.

More specifically, the face analysis unit 200 includes a partial age estimation unit 210, a partial wrinkle analysis unit 220, a visualization processing unit 240, and an analysis information output unit 250.

The partial age estimation unit 210 may extract a facial partial area image corresponding to the user image or the synthesis image of the virtual style synthesis unit 100, and acquire age estimation information by applying the facial partial area image to one or more pre-trained artificial neural network learning models. Accordingly, the style recommendation service information may include age analysis information for each facial area based on the age estimation information.

This age analysis information may be individually acquired from learning models constructed differently for each country or region corresponding to user registration information. For example, the age analysis information for each facial area according to image learning for each preset country or region, such as the United States, Korea, East, West, etc., can be extracted from different learning models. This was proposed in consideration of the problem of difficulty in distinguishing age according to country or race, etc., and the face analysis unit 200 according to an embodiment of the present invention may individually construct learning models learned with different data according to country or regional classification to acquire age analysis information for each facial area, and acquire the age analysis information using a learning model corresponding to the country or region identified according to the user registration information.

More specifically, in order to extract the age analysis information for each facial area, the artificial neural network learning model may be constructed as a learning model that outputs age information in response to the facial partial image input. For example, based on artificial neural network learning models such as ResNet, DenseNet, and MobileNet, a learning model that estimates age information for each facial area corresponding to each facial landmark can be individually constructed.

Accordingly, when providing the style recommendation service information, the recommendation service providing unit 900 may identify a facial partial area that is higher than a user input age by a first threshold value or more according to the age analysis information, acquire, from the virtual style synthesis unit 100, a synthesis image with the lowest age estimation information for the identified facial partial area among the one or more synthesis images, and configure the style recommendation service information based on the synthesis image with the lowest age estimation information.

For example, in response to a portion of the forehead predicted to be higher than the biological age input by the user by a certain value, the person information, style information, or style synthesis image of the source image whose forehead is predicted to be the lowest among the virtual style synthesis images may be included in the style recommendation service information.

In relation to this, FIG. 7 shows the facial partial age estimation model and visualization process according to an embodiment of the present invention. The age estimation model may be provided to correspond to each area, such as a first learning model corresponding to the left eye, a second learning model corresponding to the right eye, a third learning model corresponding to the skin, a fourth learning model corresponding to the nose, and a fifth learning model corresponding to the mouth, etc. Here, the estimation result can be visualized and output from the user terminal 10 as an image in which the age of each part is displayed in a graph form.

In addition, the partial wrinkle analysis unit 220 may extract a facial partial area image corresponding to the user image or the synthesis image of the virtual style synthesis unit 100, and acquire wrinkle feature information by applying the facial partial area image to one or more pre-trained artificial neural network learning models. Accordingly, the style recommendation service information may include wrinkle analysis information for each facial area based on the wrinkle feature information.

More specifically, in order to extract wrinkle analysis information for each facial area, the artificial neural network learning model may be constructed as a transformation model that converts the facial area input into wrinkle feature information in response to the facial area image input, and a learning model that indexes images with similar wrinkle feature information. For example, in transforming the wrinkle feature information, a transformation method may be used in which the frequency information obtained by Fourier transforming the image is first filtered and combined with specific data to which the well-known Hybrid Hessian filter is applied, and the area where feature information exceeding the threshold is extracted is output as wrinkle data. In addition, a known learning model such as Mobile FaceNet can be used to confirm the similarity of wrinkle feature information Accordingly, when providing the style recommendation service information, the recommendation service providing unit 900 may acquire, from the virtual style synthesis unit 100, a synthesis image with the wrinkle analysis information most similar to the wrinkle analysis information, and configure the style recommendation service information based on the synthesis image.

Meanwhile, the visualization processing unit 240 may synthesize and visualize the face analysis information, and the analysis information output unit 250 may output the visualized face analysis information to the recommendation service providing unit 900. The recommendation service providing unit 900 may provide the user terminal 10 with service data that allows the user terminal 10 to output a style interface based on the visualized face analysis information, which will be described with reference to FIGS. 8 to 12.

FIGS. 8 to 12 are diagrams illustrating style interface output information in a user terminal according to an embodiment of the present invention.

Figure 8:
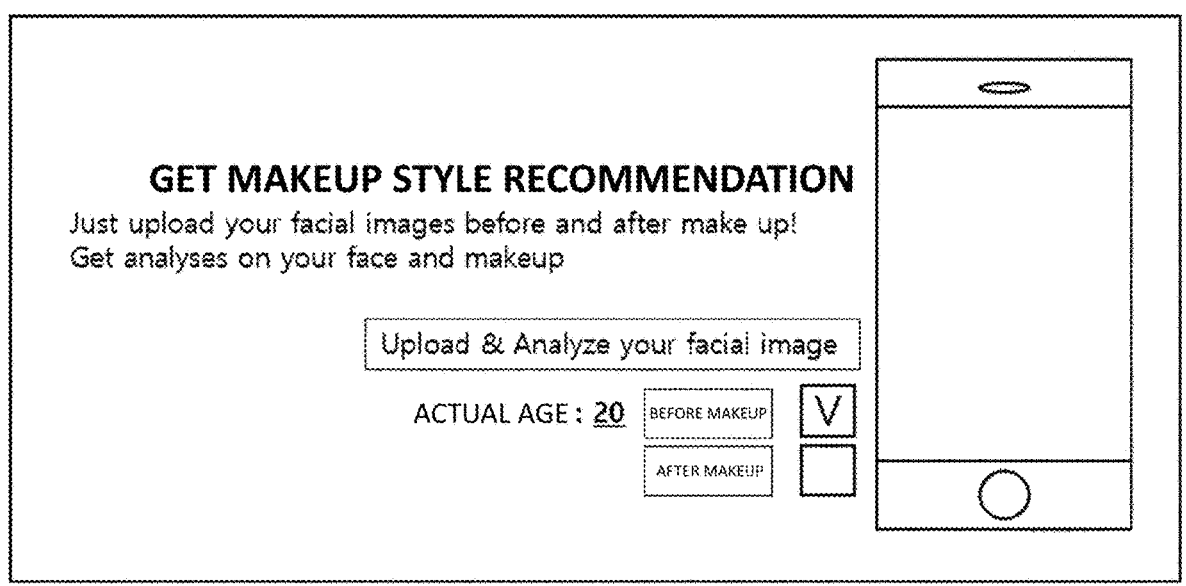

Referring to FIG. 8, first, the user terminal 10 according to an embodiment of the present invention may output an initial interface through which a makeup style for one's face can be recommended. Through the initial interface, the user may input their age information for face analysis, information on whether the input image is before or after makeup, and their own face image.

Figure 9:
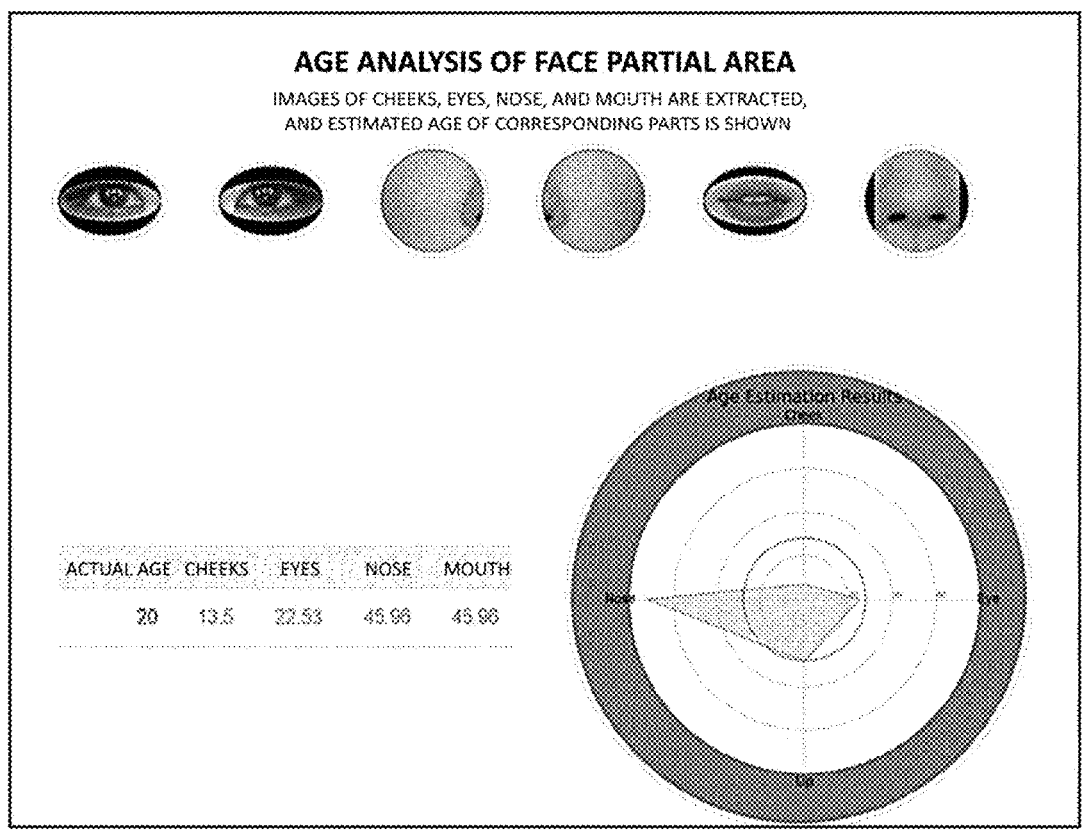

FIG. 9 shows a screen showing the results of facial partial age analysis according to an embodiment of the present invention. Here, the age (20) input by the user is displayed as a red line, and can be output in a polygonal graph form in which the predicted age values corresponding to each of the cheeks, eyes, nose, and mouth are displayed at increasing points as the distance from the center of the graph increases.

Figure 10:
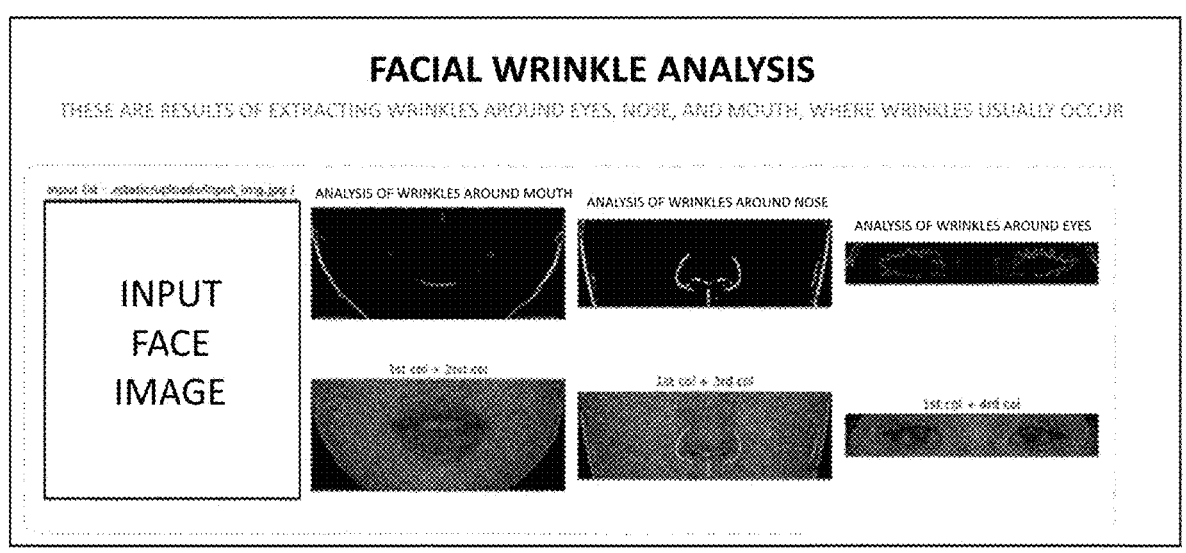

In addition, FIG. 10 shows a screen showing the results of facial wrinkle analysis of the style interface according to an embodiment of the present invention. Here, wrinkle shapes corresponding to the face image input by the user may be displayed for each area, such as wrinkles around the mouth, around the nose, and around the eyes.

FIG. 11 shows a facial analysis-based makeup style recommendation interface according to an embodiment of the present invention. As shown in FIG. 11, personal information in the source image that has the most similar facial features or can improve the facial age corresponding to the photo before or after makeup is identified through the recommendation service providing unit 900 and provided to the user terminal 10.

For example, as shown in FIG. 11, the most similar beauty YouTuber information and link information may be provided according to a specific similarity such as facial wrinkles. Through this interface, user images, synthesis images, and source images are provided together, allowing users to see how their face can change depending on the style of the source image.

Referring to FIG. 12, the style interface according to an embodiment of the present invention may provide a transfer intensity and target setting interface that can set the style transfer target and intensity for each facial area in detail.

As shown in FIG. 12, the transfer intensity may be determined to be a value such as 0 to 5 for each facial area to which each identification number is assigned, and the source image may also be changed and set to various images such as A, B, and C. Accordingly, the user can more freely test the desired style of makeup by adjusting the source image and intensity to their liking, and, based on the final applied transfer intensity and target setting information, the user can receive information on the makeup style that is considered more suitable for the user, as well as information on people and cosmetics that can be used as a reference.

The method according to the present invention described above may be produced as a program to be executed on a computer and stored in a computer-readable recording medium. Examples of the computer-readable recording medium include ROM, RAM, CD-ROM, magnetic tape, floppy disk, optical data storage device, etc.

The computer-readable recording medium is distributed in computer systems connected through a network, and a computer-readable code can be stored and executed in a distributed manner. Functional programs, codes and code segments for implementing the method can be easily deduced by programmers in the technical field to which the present invention pertains.

Although exemplary embodiments of the present invention have been shown and described above, the present invention is not limited to the specific exemplary embodiments described above, and the present invention belongs to the present invention without departing from the gist of the present invention as claimed in the claims. Various modifications can be made by those skilled in the art, and such changes are within the scope of the claims.

The invention claimed is:

1. A method of operating a service providing device, the method comprising:

collecting a source image and processing face warping of the collected source image to transform the collected source image into a warping image based on a benchmark image;

constructing, using the face warped source image, a style database to which style information of the source image is mapped; and providing a style recommendation service based on style transfer using the style database, wherein the providing of the style recommendation service based on the style transfer includes:

performing face warping on a user image input from a user terminal;

performing style transfer of the face warped source image in response to the face warped user image; and processing face reverse warping of the image subjected to the style transfer to output as a virtual style synthesis image, and the processing of the face warping of the collected source image to transform the collected source image into the warping image based on the benchmark image includes:

determining the benchmark image;

identifying landmark points of the benchmark image;

performing triangulation corresponding to the landmark points;

storing one or more pieces of triangle information determined according to the performed triangulation;

extracting a partial area image corresponding to first triangle information of the benchmark image from the source image; and calculating a transformation matrix for transforming triangle information extracted from the partial area image into the first triangle information.

2. The method of claim 1, wherein the processing of the face warping of the collected source image to transform the collected source image into the warping image based on the benchmark image includes:

transforming the entire partial area image using the transformation matrix;

removing a partial area other than an area corresponding to the first triangle information from the transformed partial area image; and combining the partial area image, on which the removing of the partial area is performed, to an image to be face warped.

3. The method of claim 1, wherein the providing of the style recommendation service includes:

performing virtual style synthesis based on style transfer between the user image and the source image; and providing a style recommendation service based on the image subjected to the virtual style synthesis, wherein the performing of the virtual style synthesis includes adjusting transfer intensity of the style transfer for each partial area of the image.

4. The method of claim 1, wherein the providing of the style recommendation service includes:

performing virtual style synthesis based on style transfer between the user image and the source image; and providing a style recommendation service based on one or more synthesis images subjected to the virtual style synthesis, wherein the providing of the style recommendation service includes:

extracting partial area analysis information corresponding to the user image; and providing style recommendation service information according to style comparison processing based on the one or more synthesis images and the partial area analysis information.

5. A service providing device comprising:

a face warping processor configured to collect a source image and process face warping of the collected source image to transform the collected source image into a warping image based on a benchmark image;

a style database configured to construct a style database to which style information of the source image is mapped, using the face warped source image; and a service providing processor configured to provide a style recommendation service based on style transfer using the style database, wherein the service providing processor performs face warping on a user image input from a user terminal, performs style transfer of the face warped source image in response to the face warped user image, and performs face reverse warping of the image subjected to the style transfer to output as a virtual style synthesis image, and the processing of the face warping of the collected source image to transform the collected source image into the warping image based on the benchmark image includes:

determining the benchmark image;

identifying landmark points of the benchmark image;

performing triangulation corresponding to the landmark points;

storing one or more pieces of triangle information determined according to the performed triangulation;

extracting a partial area image corresponding to first triangle information of the benchmark image from the source image; and calculating a transformation matrix for transforming triangle information extracted from the partial area image into the first triangle information.

6. The service providing device of claim 5, wherein the service providing processor includes:

a virtual style synthesis processor configured to perform virtual style synthesis based on style transfer between the user image and the source image; and a recommendation service providing processor configured to provide a style recommendation service based on the image subjected to the virtual style synthesis, and the service providing device further includes a transfer intensity adjustment processor configured to adjust transfer intensity of the style transfer performed in the virtual style synthesis processor for each partial area of the image.

7. The service providing device of claim 5, wherein the service providing processor includes:

a virtual style synthesis processor configured to perform virtual style synthesis based on style transfer between the user image and the source image; and a recommendation service providing processor configured to providing a style recommendation service based on one or more synthesis images subjected to the virtual style synthesis, wherein the recommendation service providing processor extracts partial area analysis information corresponding to the user image and provides style recommendation service information according to style comparison processing based on the one or more synthesis images and the partial area analysis information.

8. A method of operating a service providing device, the method comprising:

collecting a source image and processing face warping of the collected source image to transform the collected source image into a warping image based on a benchmark image;

constructing, using the face warped source image, a style database to which style information of the source image is mapped; and providing a style recommendation service based on style transfer using the style database, wherein the processing of the face warping includes:

determining the benchmark image;

identifying landmark points of the benchmark image;

performing triangulation corresponding to the landmark points; and storing one or more pieces of triangle information determined according to the performed triangulation, and wherein the processing of the face warping further includes:

extracting a partial area image corresponding to first triangle information of the benchmark image from the source image; and calculating a transformation matrix for transforming triangle information extracted from the partial area image into the first triangle information.

9. The method of claim 8, wherein the processing of the face warping includes:

transforming the entire partial area image using the transformation matrix;

removing a partial area other than an area corresponding to the first triangle information from the transformed partial area image; and combining the partial area image, on which the removing of the partial area is performed, to an image to be face warped.

10. The method of claim 8, wherein the providing of the service includes:

performing virtual style synthesis based on style transfer between the user image and the source image; and providing a style recommendation service based on the image subjected to the virtual style synthesis, wherein the performing of the virtual style synthesis includes adjusting transfer intensity of the style transfer for each partial area of the image.

11. A non-transitory computer-readable medium storing instructions for executing the method of claim 1 on a computer.

12. A non-transitory computer-readable medium storing instructions for executing the method of claim 8 on a computer.

\* \* \* \* \*